United States Patent [19]
Campbell et al.

[11] Patent Number: 5,272,649
[45] Date of Patent: Dec. 21, 1993

[54] VIDEO METHOD AND APPARATUS FOR MEASURING AND CONTROLLING DIMENSIONAL STABILITY

[76] Inventors: Gregory A. Campbell, Rte. #2, Box 318, Canton, N.Y. 13617; Paul A. Sweeney, 3 Loeser Ave., Somerville, N.J. 08876

[21] Appl. No.: 785,409

[22] Filed: Oct. 31, 1991

Related U.S. Application Data

[63] Continuation-in-part of Ser. No. 507,302, Apr. 11, 1990, abandoned.

[51] Int. Cl.⁵ .............. G01B 11/00; G06G 7/19; B29C 47/00
[52] U.S. Cl. .................. 364/560; 364/563; 364/576; 382/8; 425/146; 264/40.2; 264/40.7; 356/385
[58] Field of Search ............ 364/560, 563, 576; 356/384, 385; 425/140; 264/40.2, 40.7; 358/107; 382/8, 22

[56] References Cited

U.S. PATENT DOCUMENTS

| | | | |
|---|---|---|---|
| 4,614,764 | 9/1986 | Colombo et al. | 525/72 |
| 4,699,580 | 10/1987 | Co | 425/140 |
| 4,780,831 | 10/1988 | Iwata et al. | 364/484 |
| 4,833,722 | 5/1989 | Morton et al. | 382/22 |
| 4,965,842 | 10/1990 | Crossley et al. | 382/8 |
| 4,969,202 | 11/1990 | Groezinger | 382/22 |
| 4,974,077 | 11/1990 | Kusaba | 358/101 |
| 5,045,401 | 9/1991 | Tabor et al. | 428/516 |
| 5,103,412 | 4/1992 | Ueda et al. | 364/563 |
| 5,104,593 | 4/1992 | Joseph | 264/23 |
| 5,152,943 | 10/1992 | Sulzbach | 264/40.7 |

Primary Examiner—Jack B. Harvey
Assistant Examiner—Brian M. Buroker
Attorney, Agent, or Firm—Wall and Roehrig

[57] ABSTRACT

A method and apparatus for determining the location and stability of location of the edges of an object such as an extruded blown film polymeric material annulus. By real time detection of the edge location and mathematical and statistical manipulation of the data in both time and frequency domains, the stability and effects of extrusion parameters on the object can be determined.

22 Claims, 13 Drawing Sheets

VIDEO METHOD AND APPARATUS FOR MEASURING AND CONTROLLING DIMENSIONAL STABILITY

FIELD OF INVENTION

This is a continuation-in-part of application Ser. No. 07/507,302 filed Apr. 11, 1990, now abandoned. The present invention relates to determination of the stability of polymeric systems. More particularly, the present invention is related to a non-contact means for determining the stability of processes such as blown film production, film casting and fiber spinning.

BACKGROUND OF THE INVENTION

Precise measurement and control of the positions of the materials during many polymeric processes are required to obtain consistent physical properties in the final product. Traditionally, only qualitative assessments of the stability of processes such as blown film, film casting and fiber spinning have been undertaken in the process industry. Therefore, the processes could not be optimized for maximum production rate with a minimum of physical property variation. Also, the effect of different additives and additive concentrations on stability can only be qualitatively determined with prior art systems. There is a need to be able to determine the stability of these processes while the materials are running and to be able to quantitatively determine the effect of additives and process variables on the stability of these processes. By using techniques that determine the relative position of the edges of the material and a means for relating the relative changes in those positions as a function either of time or frequency, one can determine the magnitude and type of instability. Since these processes operate at rates often in excess of 300 feet per minute, it is not desirable to try to measure stability using a contact system. Therefore, a non-contact system is more desirable.

Several investigations over the last few years have been undertaken to determine the stability of fiber spinning, film casting and blown film processing. All of these investigations used either very qualitative or off-line techniques as has been detailed by J. L. White and H. Tanaka, Journal of Applied Polymer Science, 26, 579 (1981) and S. Kase, Journal of Applied Polymer Science, 18, 3279 (1974), to name two. These investigations have used techniques that are not amenable to process optimization or process control on full scale equipment. Since much of the stability analyses were carried out in a qualitative manner, the determinations are observer dependent and as a result, are not consistent from day to day nor are they easily transportable from one process line to the next.

The stability of processes such as blown film, film casting and fiber spinning is what limits the rate and therefore the product profitability. In the industry today, almost all blown film, fiber spinning and film casting operations are operated at a limit well below the point where the material becomes unstable in order to maintain quality and reproducibility. Therefore, there is a need for a method and apparatus that provides accurate noncontact measurement of the stability of these types of processes such that the processes can be operated at maximum efficiency and such that resin development can be undertaken that provides materials which are optimized for maximum production rate with minimal stability problems.

OBJECTS AND SUMMARY OF THE INVENTION

Accordingly, it is an object of the present invention to provide a non-contact apparatus and method for measuring the position of a polymeric material such as a blown film as a function of time.

It is another object of the present invention to provide a non-contact apparatus and method for determining the change in the position of polymeric materials as a function of time.

It is yet another object of the present invention to provide a method and apparatus for measuring the shape of polymeric material as a function of position of the blown film in the process.

It is a still further object of the present invention to provide an apparatus for measuring the frequency characteristics of the position of the polymeric materials.

It is yet another object of the present invention to provide real time control of the polymeric processes such that improved products can be manufactured at a lower cost.

It is another object of the present invention to provide a method for measuring process changes by measuring the changes in the shape of the end product such as blown films, film casting and the like resulting from changes in the process material composition.

It is another object of the present invention to measure the rate of change of position of a polymeric material edge to optimize the control of the process operation.

It is another object of the present invention to provide a means and apparatus for detecting the edge position of an object.

It is a still further object of the present invention to detect the edge position of an object as a function of time and/or frequency domain characteristics determined mathematically or statistically.

In accordance with a preferred embodiment of the present invention, an apparatus for the measurement of polymeric process stability as applied to blown film is described in which the blown film flows from the die to the nip rolls and is cooled with intensified cooling by air. The film is positioned in the optical path of a camera such that the edges of the film are within the field of view of the camera. The edges of the film are detected and the information is stored in a device such that the position of the film as a function of time can be determined by computational means based on either numerical or analytical techniques. The camera must be consistent with the type of radiation being emitted, reflected or transmitted by the film. Each scan line of the camera is monitored for a change in intensity of the radiation. When the first intensity change occurs, the first edge of the film will have been detected and the second edge of the film is detected when the intensity of the radiation reverts back to approximately the level that existed before the detection of the first intensity change. The relative position of the two edges on the scan line are then transferred as digital words to the storage means and the data are accumulated for a period of time. The data are then analyzed such that the positions of the film can be determined as a function of time. These data can then either be analyzed from a statistical point of view to determine the mean and standard deviation of the position of the film or they can be analyzed by some other method such as Fourier analysis which converts the time domain data into frequency domain data.

BRIEF DESCRIPTION OF THE DRAWINGS

Further objects and advantages thereof may best be understood by reference to the following description taken in connection with the accompanying drawings in which:

FIG. 9b is an expanded scale plot of the low frequency end of FIG. 9a.

FIG. 10b is an expanded scale plot of the low frequency end of FIG. 10a; and

DETAILED DESCRIPTION OF A PREFERRED EMBODIMENT

Figure 1:
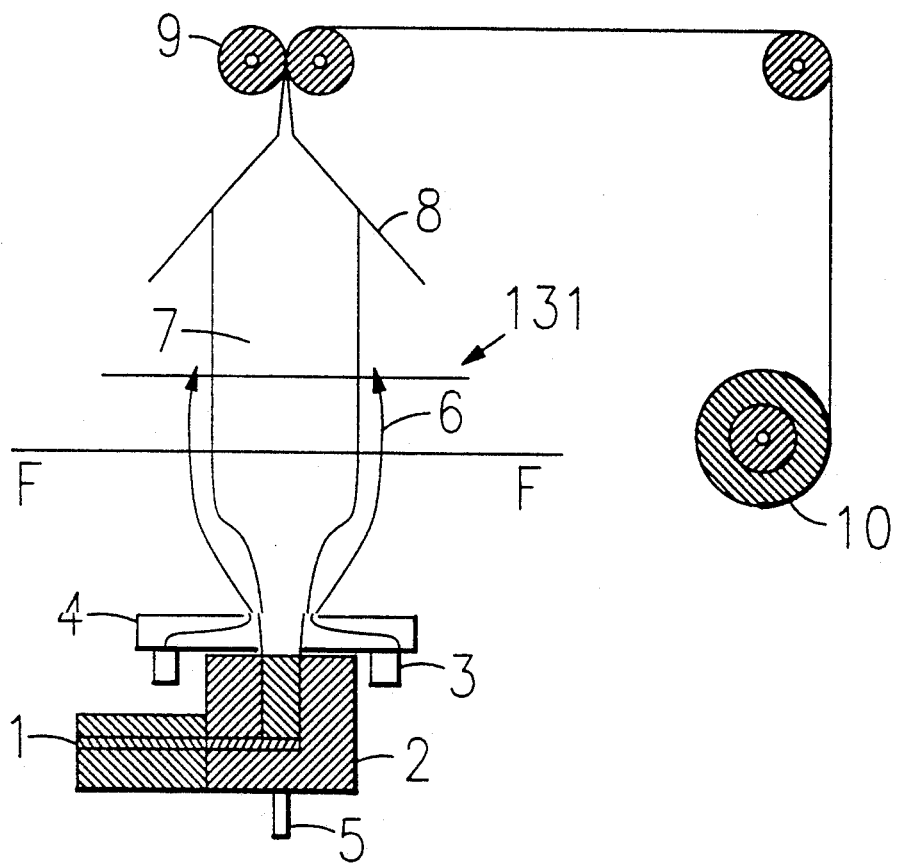
FIG. 1 is a schematic diagram of a blown film line.

FIG. 1 shows a typical blown film process in which a polymeric resin 1 is extruded through a spiral mandrel die 2 which forms the resin into an annular configuration 7. This extruded annulus is bi-axially extended in the machine direction by the action of the nip rolls 9 pulling on the polymer and in the transverse direction by the hoop stress created by air injected into the closed annulus through orifice 5. This creates a pressure difference between the internal pressure of the bubble and the local pressure on the outside of the bubble. The polymer melt is cooled by radiation and convection to the air flowing past the annulus from the air ring 3. This is shown diagrammatically by the arrows 6 in FIG. 1. As the melt cools, it undergoes a transition into either a glassy or crystalline solid at or above the freeze line F. It is assumed that no macroscopic deformation occurs above the freeze line F. This polymeric annulus is collapsed into a flat profile by the collapsing frame 8 before it enters the nip rolls 9. The flattened tube or annulus 7, is then collected on a winder 10.

It was also recognized quite early that the limiting factor to the ultimate rate of production and reproducible physical properties of polymeric film was the fact that the process becomes unstable as you exceed certain critical values of the operating parameters of the process for a particular polymeric resin. Process instability, in conjunction with certain polymer properties, is what limits the rate of production and product consistency and therefore, the profitability of commercial blown film systems.

Figure 2:
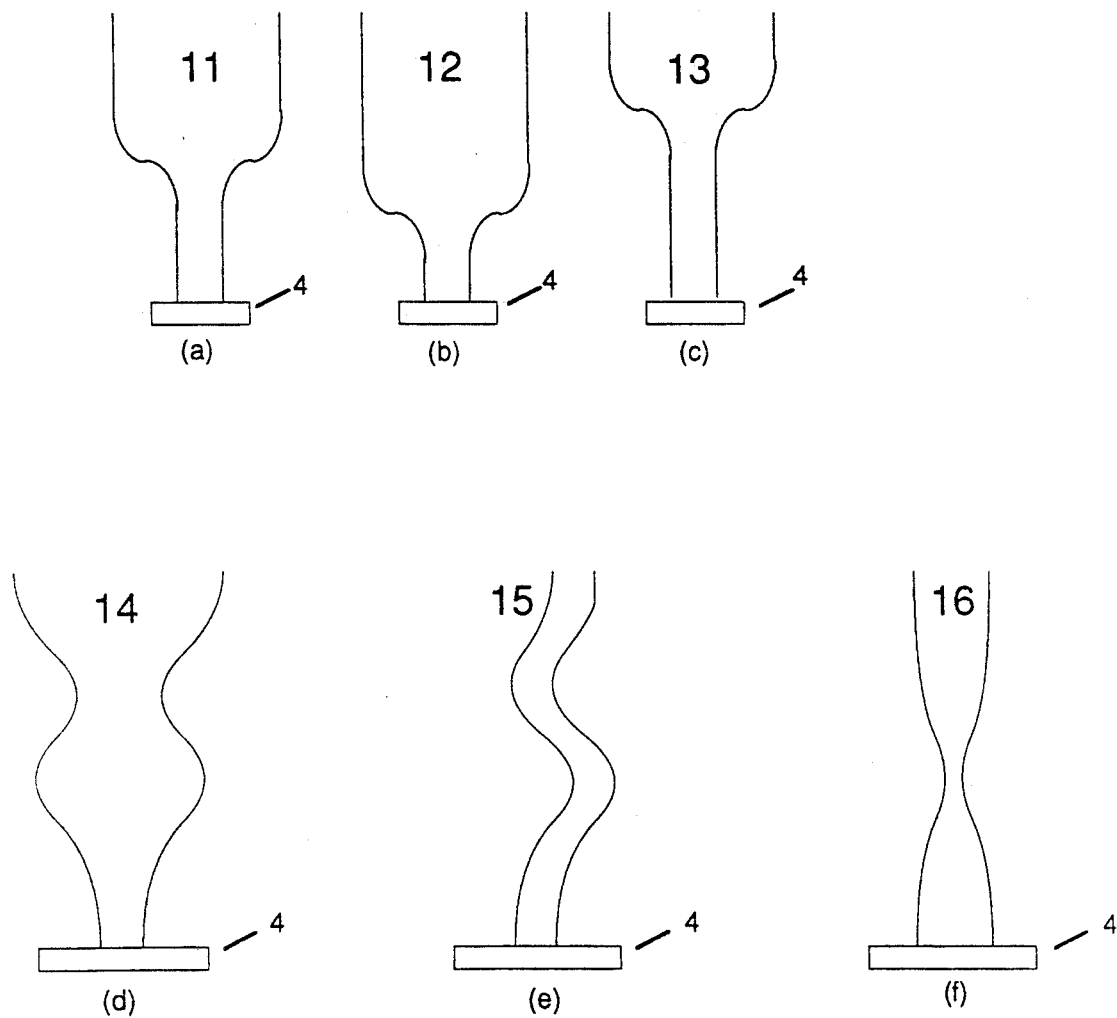
FIGS. 2a-2f is a schematic representation of blown film instability types.

There are four types of instability that are traditionally discussed in the literature. As shown in FIGS. 2(a–f), they are draw resonance 16, bubble instability 14, helical instability 15 and metastability 11, 12 and 13.

Figure 3:
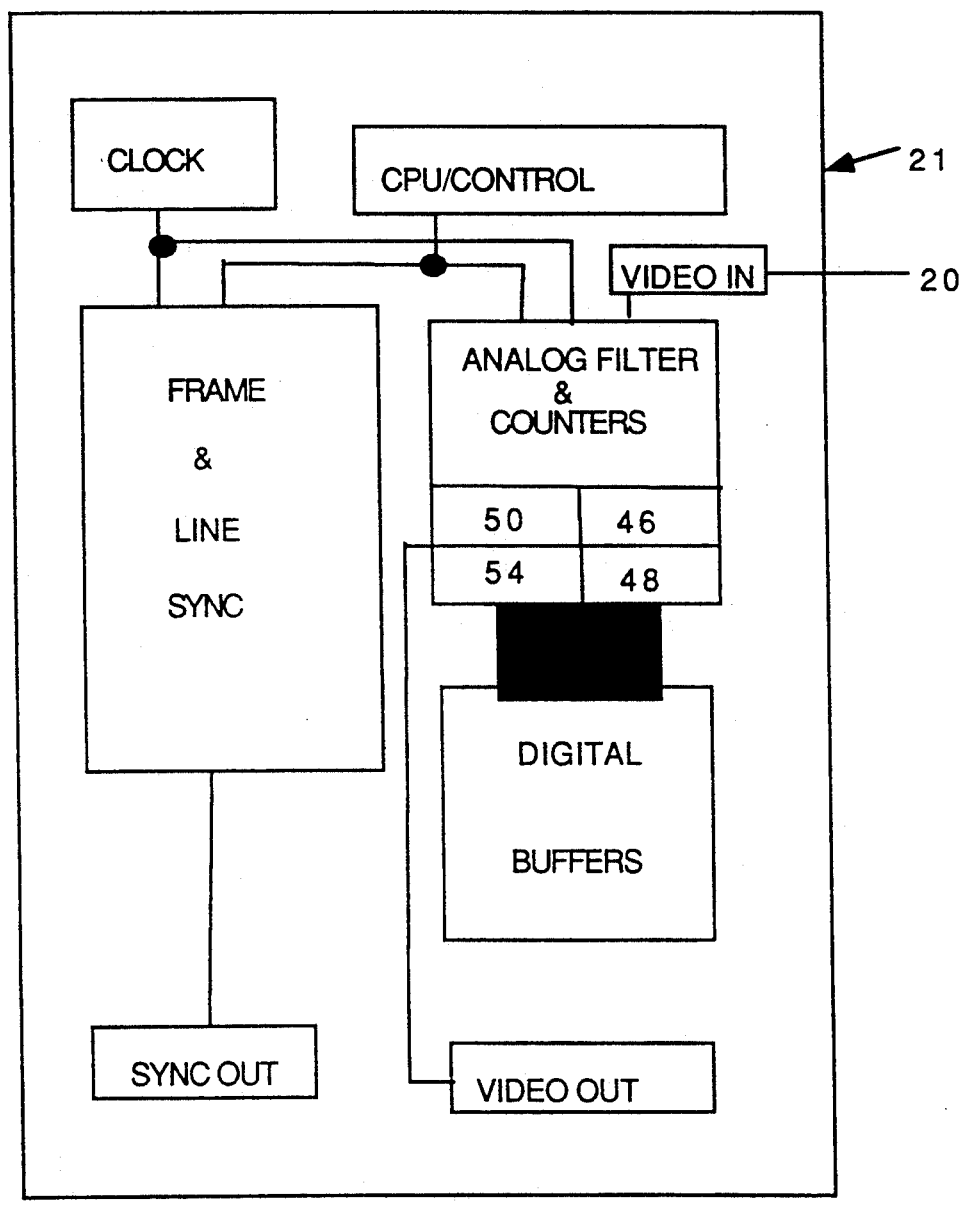
FIG. 3 is a block diagram of the edge finding analog filter and control of the present invention.
Figure 4:
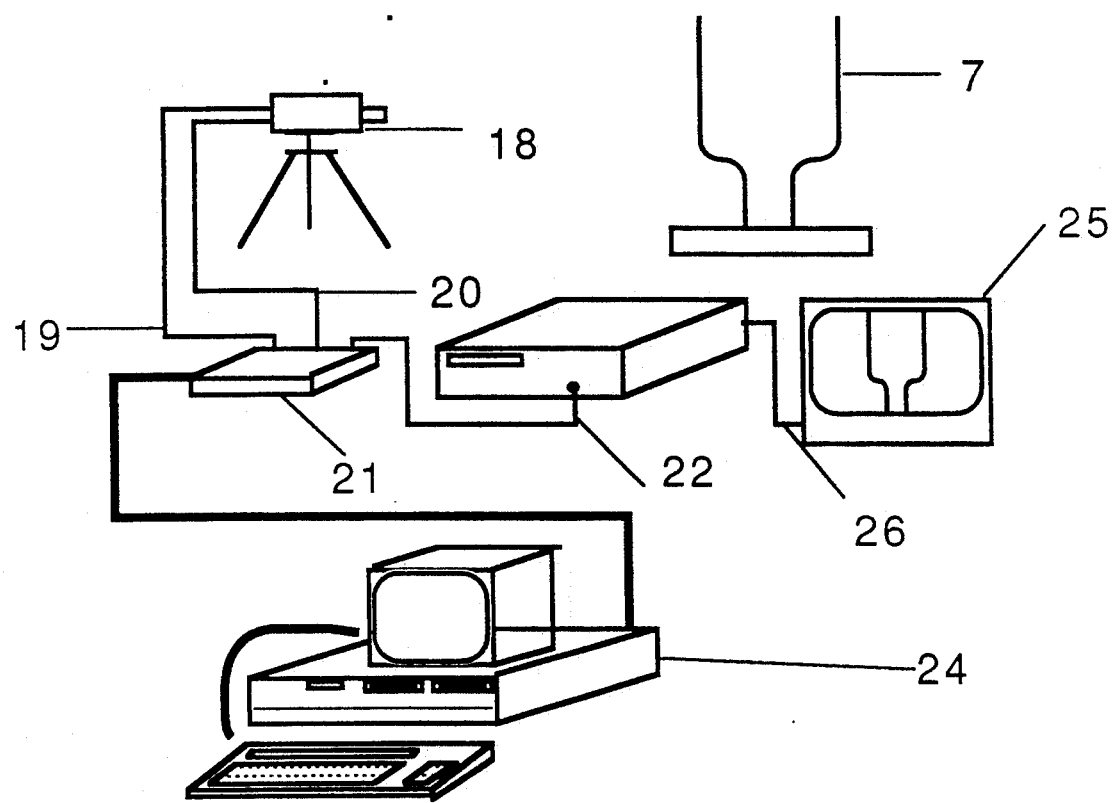
FIG. 4 is a block diagram of the invention as applied to a blown film process.

FIG. 4 shows a specific embodiment of the present invention in which a personal computer video camera device provides a near real time quantitative assessment of the magnitude and type of the observed instability in a manufacturing system for producing a product such as that of FIG. 1. The equipment consists of a black and white video camera 18 that captures the motion of the bubble 7 in real time under various processing conditions. The real time video signal is passed to an analog filter 21 shown in block diagram form in FIG. 3. The filter 21 performs four basic functions in the system, namely; it controls the camera 18, it provides an analog comparison of the signal from the camera with predetermined signals, it provides digital counters for quantitizing the location of the edges of the object being viewed and it provides circuitry for transferring the quantized edge location information from the counters to a direct memory access card located in the microprocessor. The microprocessor 24 controls how much of the video image information is saved and what operations are performed on the retained data.

Filter 21 detects the position of the edges of the film as a function of time from the video signal, which signal is also recorded on a VCR 22 and the tape is retained for historic use and backup. The analog filter 21 was developed, rather than use a commercially available image recording system, to minimize the computing time and memory needed to analyze the data so as to permit near realtime control. For instance, if we assume a commercial system breaks each data line into 1,000 pixels, with 500 usable data lines per frame at 30 frames per second, we would have over 15,000,000 pieces of digital information to process and store each second. This is a task which is well beyond the capability of most personal computers. The analog filter 21 as described herein, will process only the positions of the bubble edges for each of the camera's scan lines. This reduces the amount of information requiring processing and storage to 31,500 pieces per second as well as eliminating the need to search the recorded data for the bubble edges. A further reduction to 1,100 pieces per second can be made as will be described herein.

The analog filter 21 shown in FIG. 3 works as follows: At the start of each video line scanned by the camera 18, two sixteen bit counters 46 and 48 are reset to zero, and sync pulses are sent to the camera via cable 19. The incoming analog video signal 20 from camera 18 is passed through a high speed comparator 50 in the filter 21 which compares the current value of the voltage, corresponding to the light intensity received by the camera 18, with a preselected cut off voltage reference 54 stored in filter 21. The signal is then passed to the VCR 22, for historic use, and the TV monitor 25 so that the process can be observed in real time. The video signal includes the entire image seen by camera 18. If the video signal voltage does not exceed a user defined cut off value 54, the counters are incremented. If the voltage does exceed the preset cut off value, the first counter is stopped, determining the position of the first edge. At the next significant change in video signal intensity, the voltage will drop below the cut off voltage and the second counter is stopped. This count corresponds to the second edge of the film. Upon reaching the end of the line, a Direct Memory Access (DMA) transfer request is initiated and the two sixteen bit words (containing the position data) are transferred to a DMA card located in the personal computer 24. The left position word is transferred first followed by the right position word. The filter 21 (FIG. 3) also generates an interrupt signal at the start of every frame which can be used for initializing the software data analysis.

The Bit Map For the Sixteen Bit Words used to Transfer Edge Information is as Follows:
A0–B2 Position Data
B3–B5 Unused
B6 Field Indicator Bit (0 for Field 1, 1 for Field 2)
B7 Error Bit (Set if one of the counters is not stopped)

The resolution of the system is determined by the camera's field of vision, the camera's noise characteristics, the clock speed and the speed of the comparator. For instance, if one scan line with a video camera takes 63.5 microseconds and the clock speed is set at 14.32 MHz, each line is divided into 909 "pixels". If the camera's field of vision is 909 millimeters, the resolution with this system would be 1 millimeter. Therefore, the camera should be positioned and focused such that the region of interest occupies most of the screen for maximum sensitivity. The data obtained using this system are used to determine the edges of the object, in this case the blown film bubble, annular tube 7.

As indicated above, this edge information comprises in excess of thirty thousand data points, and is a significant amount of information to process. The newer and faster computers that are now becoming available will of course allow the complete data set to be used. However, because in the blown film process the material is assumed to stop all noticeable deformation above the frost line F, we only need to analyze a single line above this point on the bubble for the following two reasons:

1.) Any perturbations in bubble radius above this point are now permanent defects in the film.
2.) The velocity above the frost line is constant which will allow us to potentially relate the observed instabilities to variations in the physical properties of the film.

With these assumptions, we will only have about 120 pieces of information to analyze per second. This analysis is amenable to real time processing on even one of the slower personal computers. Recording this amount of data to disk as well as doing additional processing is within the capabilities of most personal computers. However, if one eliminates the additional processing, recording all of the lines and storing them would be possible.

Figure 5:
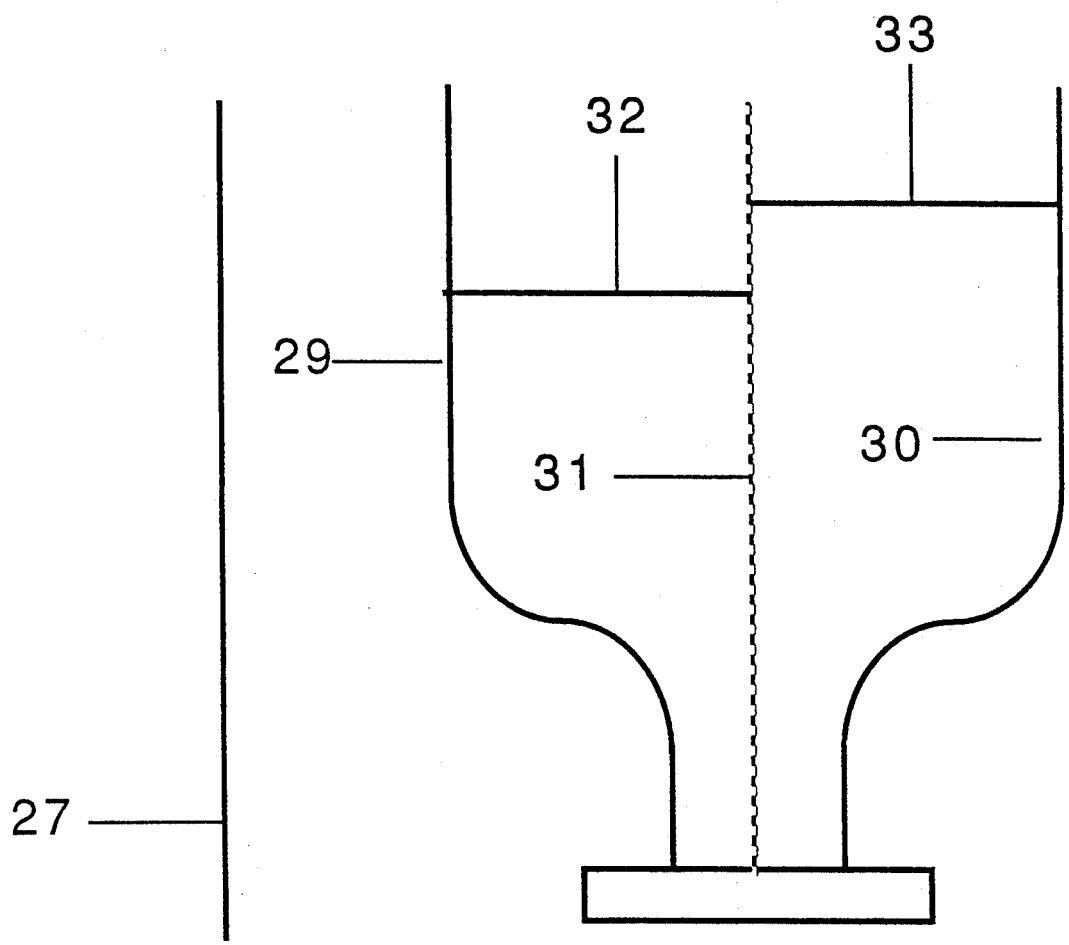
FIG. 5 is a diagram of the distance measurements used in the edge location and stability analysis.

Referring now to FIG. 5, the measurements derived from the filter 21 of the edge data and the bubble radii relative to the die centerline, are depicted diagrammatically. Before the two edge measurements 29 and 30 can be converted into the desired data, two operations must have been accomplished previously. First, the system must be calibrated with a known length scale so the sixteen bit words can be related to spatial distances. Second, the position of the die center line must be determined so that the bubble's position relative to the centerline can be calculated.

Figure 9A:
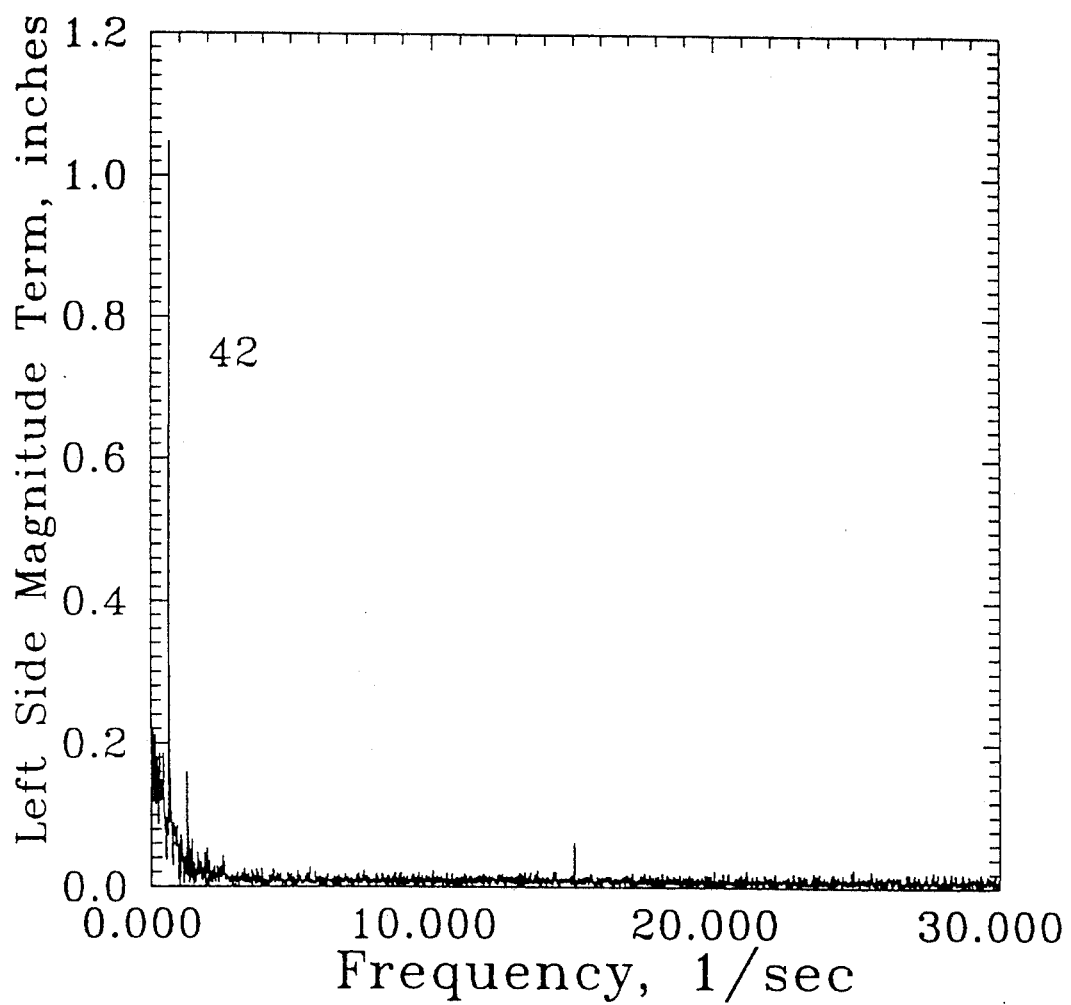
FIG. 9a is a plot of the bubble annulus left side Fourier analysis magnitude as a function of frequency response.
Figure 9B:
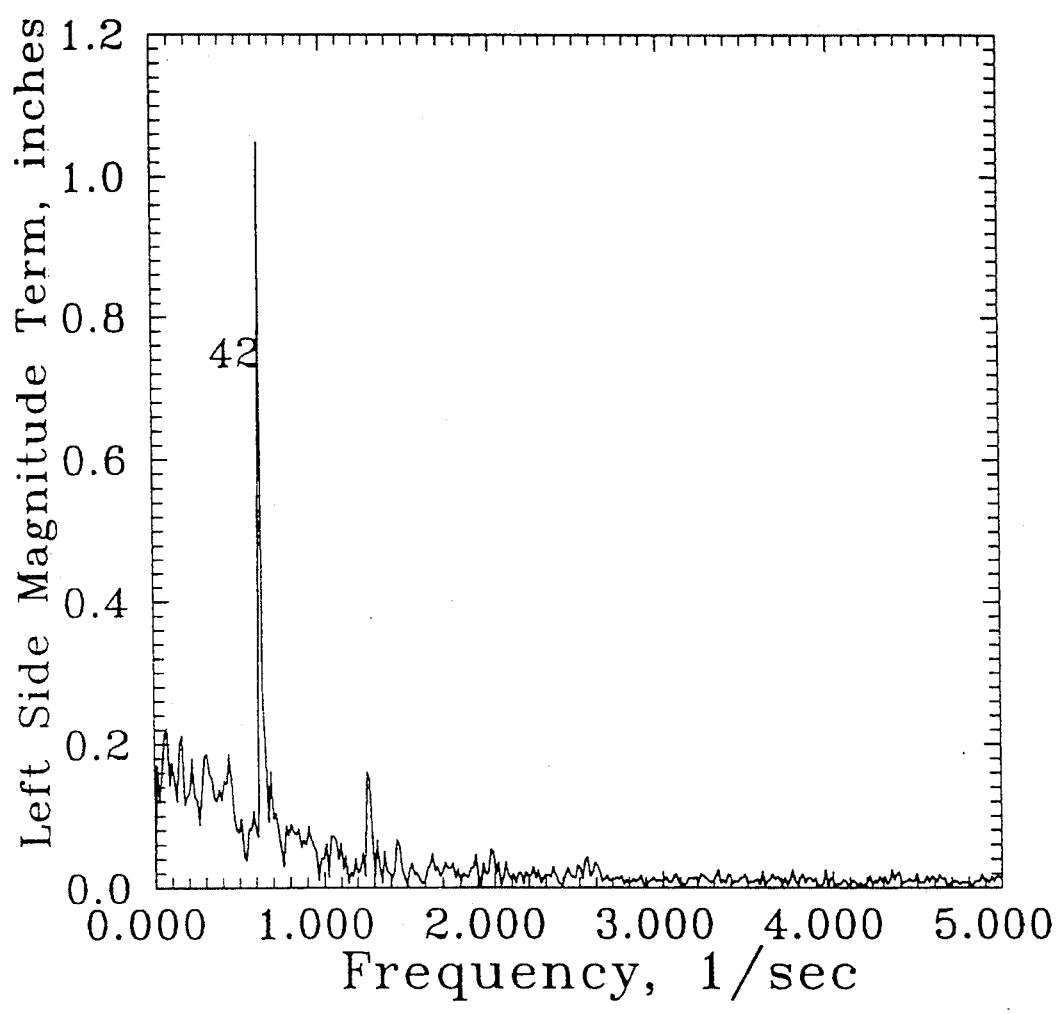
Figure 10A:
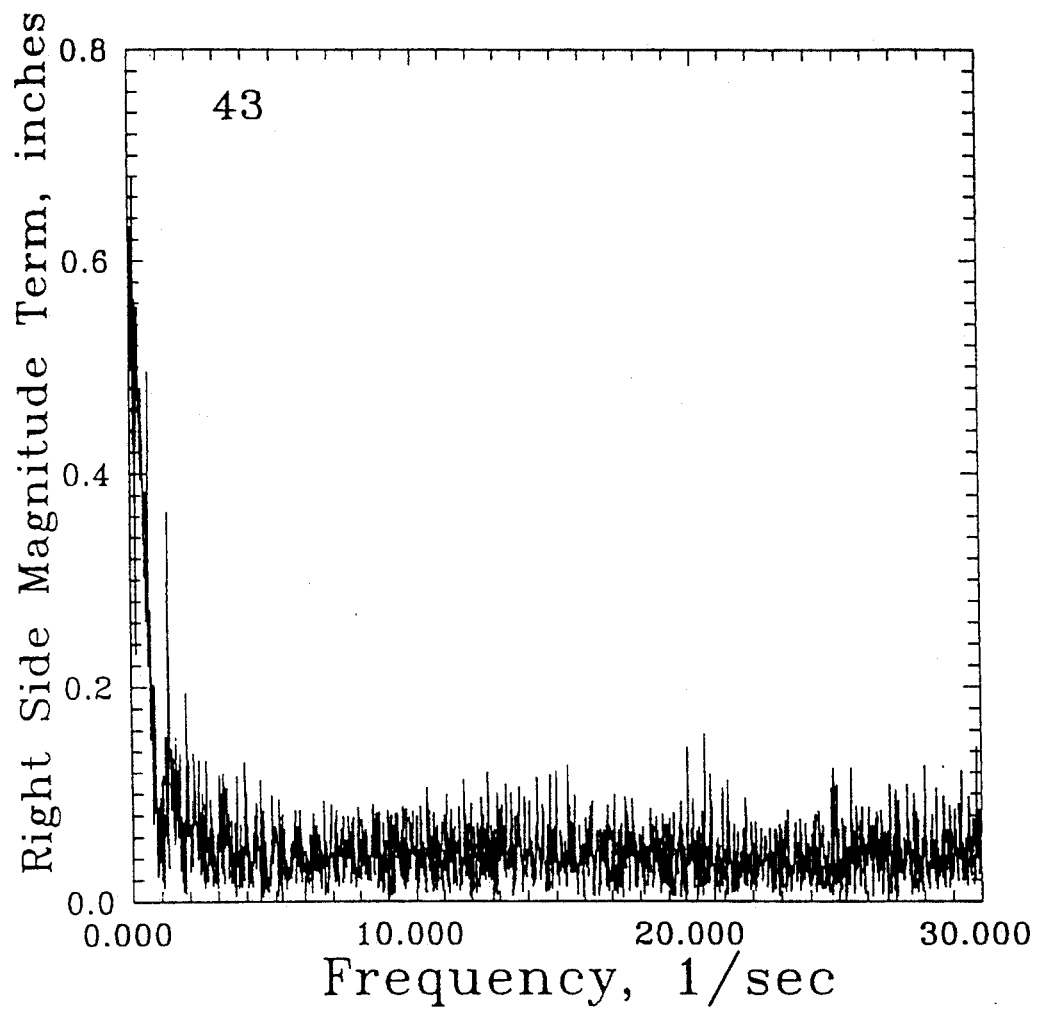
FIG. 10a is a plot of the bubble annulus right side Fourier analysis magnitude as a function of frequency response.
Figure 10B:
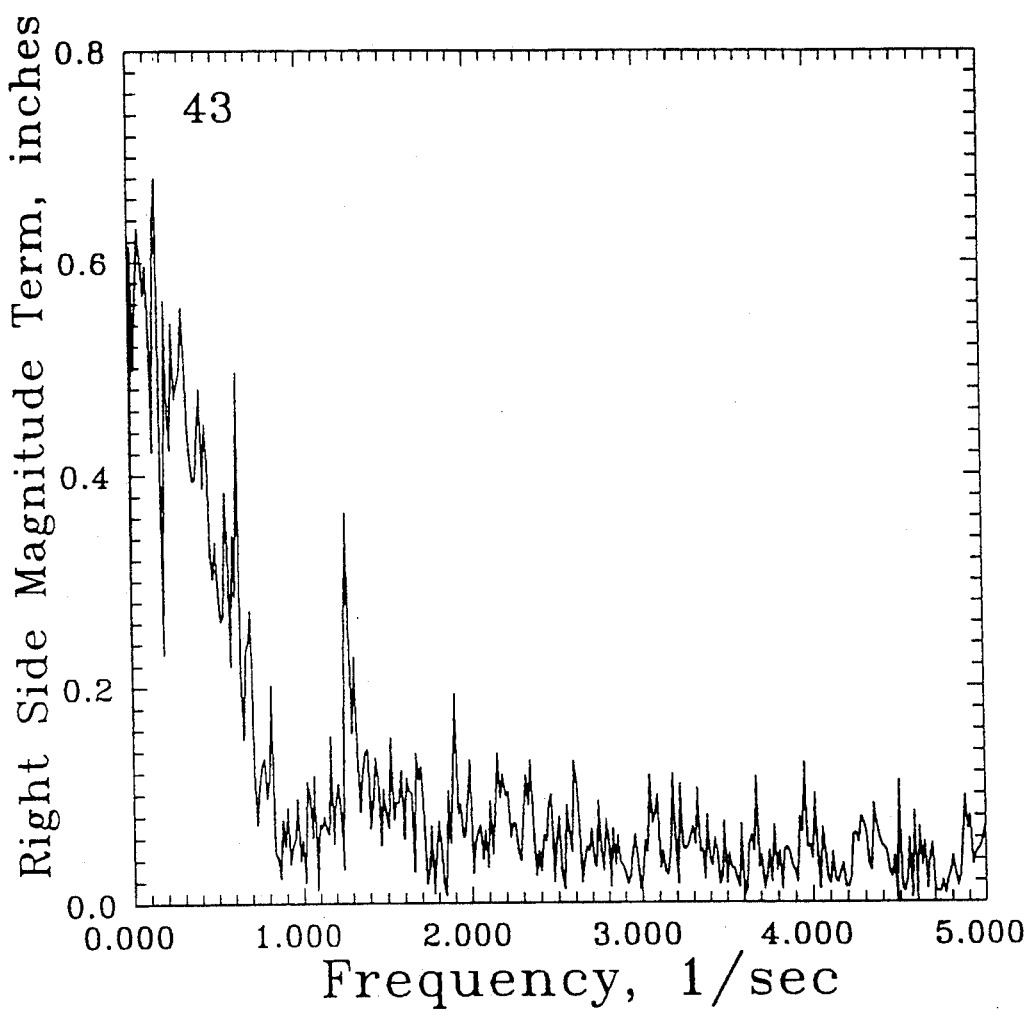

Since the counters are reset at the beginning of each scan line, the digital words representing the edges 29,30 of the annulus 7 can be considered to be referenced to a plane 27 in FIG. 5, which is the position of the leftmost part of the field of view of the camera 18. The data processing consists of first converting the sixteen bit words from the filter, into two distances 32 and 33 relative to the centerline 31 of die 2. The data can be represented as an average radii plus/minus two or three standard deviations. Alternatively, since the camera scans at a known rate, and the time is known, a Fast Fourier transform can be taken of the time-position data. To minimize the effects of spectral leakage during the Fast Fourier Transform, the bubble radii measurement is averaged and then subtracted from the actual measurement before taking the transform. The complex value Fourier coefficients can be converted into the polar representation for a complex number which consists of a magnitude and a frequency argument (See FIGS. 9 and 10). The magnitude term will be representative of the magnitude of the instability in the process while the frequency argument is used to characterize the type of instability. If the disturbances in the radius on each side of the bubble are in phase, the bubble is either metastable or experiencing bubble instability. In general, metastable instability FIGS. 2(a-c) only occurs when producing high density blown film and generally has a longer wavelength than bubble instability FIG. 2(d). If the disturbances are out of phase by approximately $\pi$ radians, the bubble is helically unstable FIG. 2(e).

EXAMPLE ONE

A blown film line comprising a 3 inch single screw extruder, a six inch die, a dual lip air ring, internal bubble cooling and a commercial scale tower were used in this example. The monitoring and control system (FIG. 4) included a video camera, model WV1500X by Panasonic. It was positioned approximately four feet from the center of the die which provided a field of view extending from the top of the air ring to above the frost line F. The video camera was connected to the filter by two coaxial cables. The first was a composite sync signal which provided the vertical and horizontal sync pulses generated by the filter 21 to the camera 18. The second returned the video voltage output to the filter. The filter was cabled to a MetraByte DMA board, Model PDMA-16, which was placed in the backplane of a Zenith model 248 AT compatible computer. The video signal was also ported to a Panasonic VCR, Model NV8950 and to a Mitsubishi, Model CS2654R, television monitor.

Before the blown film line was started, an 8.5 inch diameter, four foot long white PVC tube was placed at the center of the extrusion die and used to determine the centerline and act as a distance standard for converting the number of pixels to a quantitative distance measurement. The film line was started using a base resin (LLDPE) and run at an extruder output rate of 290 lbs/hr. The criteria for determining stable operation rate is the distance range between the two edges of the annulus at scan line 131 in each field. This distance range corresponds to the diameter of the annulus and denotes the typical diameter variation which can be found using the following formula.

Distance range $= [(X_r + n\sigma_r) - (X_l + n\sigma_l)] - [(X_r - n\sigma_r) - (X_l - n\sigma_l)]$ $X_r$ = Mean right side position
$X_l$ = Mean left side position $\sigma_r \equiv$ Standard Deviation of right side position
$\sigma_l \equiv$ Standard Deviation of left side position
In the specific example being discussed, the formula becomes:

$$\text{Diameter range} = [(X_r + 3\sigma_r) - (X_l + 3\sigma_l)] - [(X_r - 3\sigma_r) - (X_l - 3\sigma_l)]$$

$X_r \equiv$ Mean right side position
$X_l \equiv$ Mean left side position
$\sigma_r \equiv$ Standard Deviation of right side position
$\sigma_l \equiv$ Standard Deviation of left side position Physically, this value is an estimate of the maximum diameter minus the minimum diameter to a confidence of three standard deviations for each side of the bubble. The diameter range is calculated using the standard deviations of the data since it is less sensitive to outliers than the range of the actual data. During the experiment control actions were taken to maintain the diameter range at a value of one inch or less. In general, the diameter range will be maintained at a desired percentage of the actual diameter of the object being observed.

Figure 6:
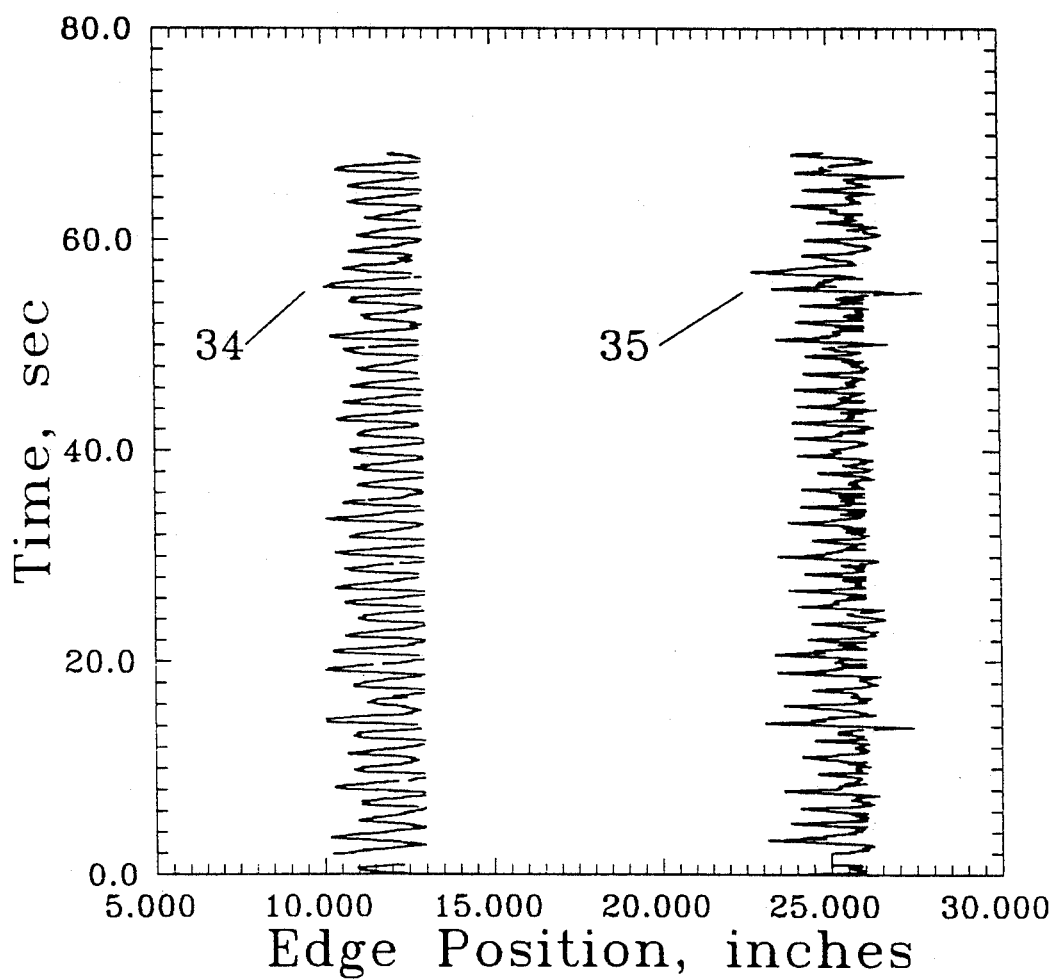
FIG. 6 is a plot of the edge positions of the blown film bubble with time.
Figure 7:
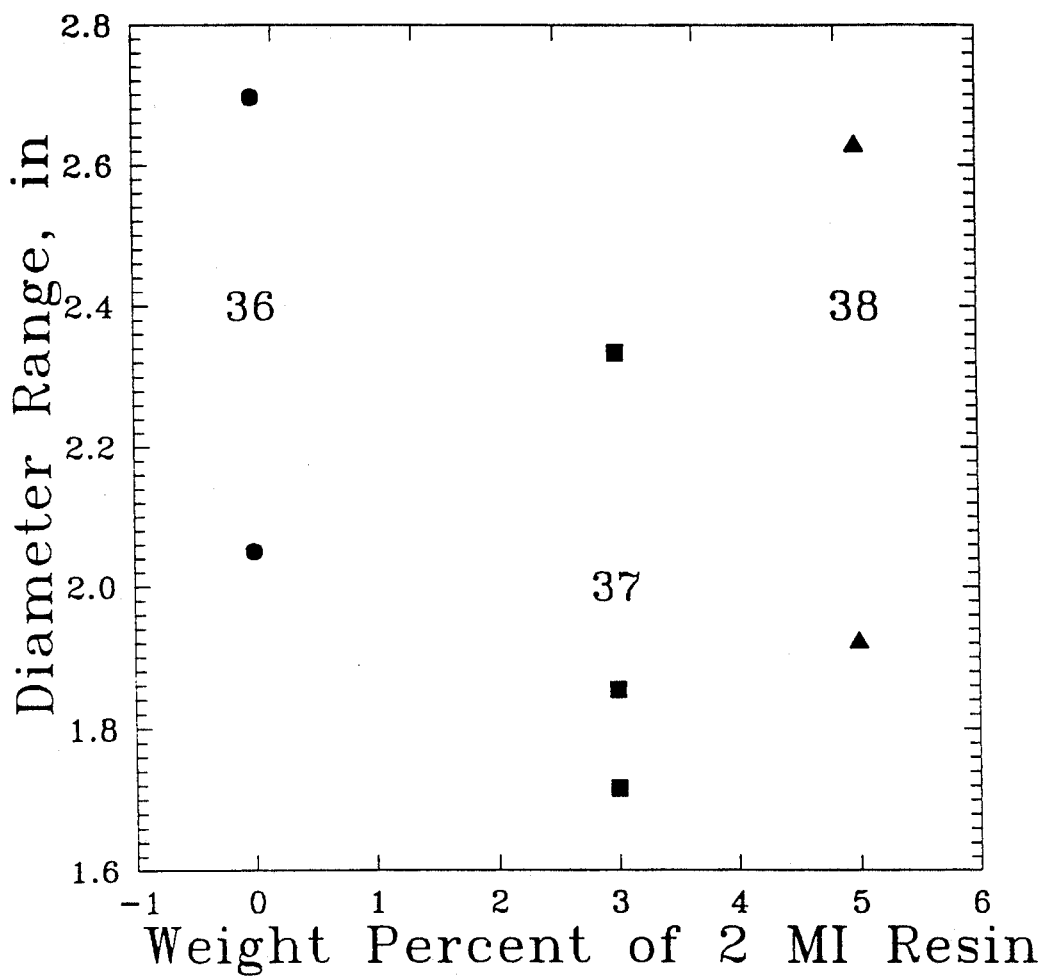
FIG. 7 is a plot of the change in the diameter of the bubble annulus as a function of 2 MI high pressure resin concentration.
Figure 8:
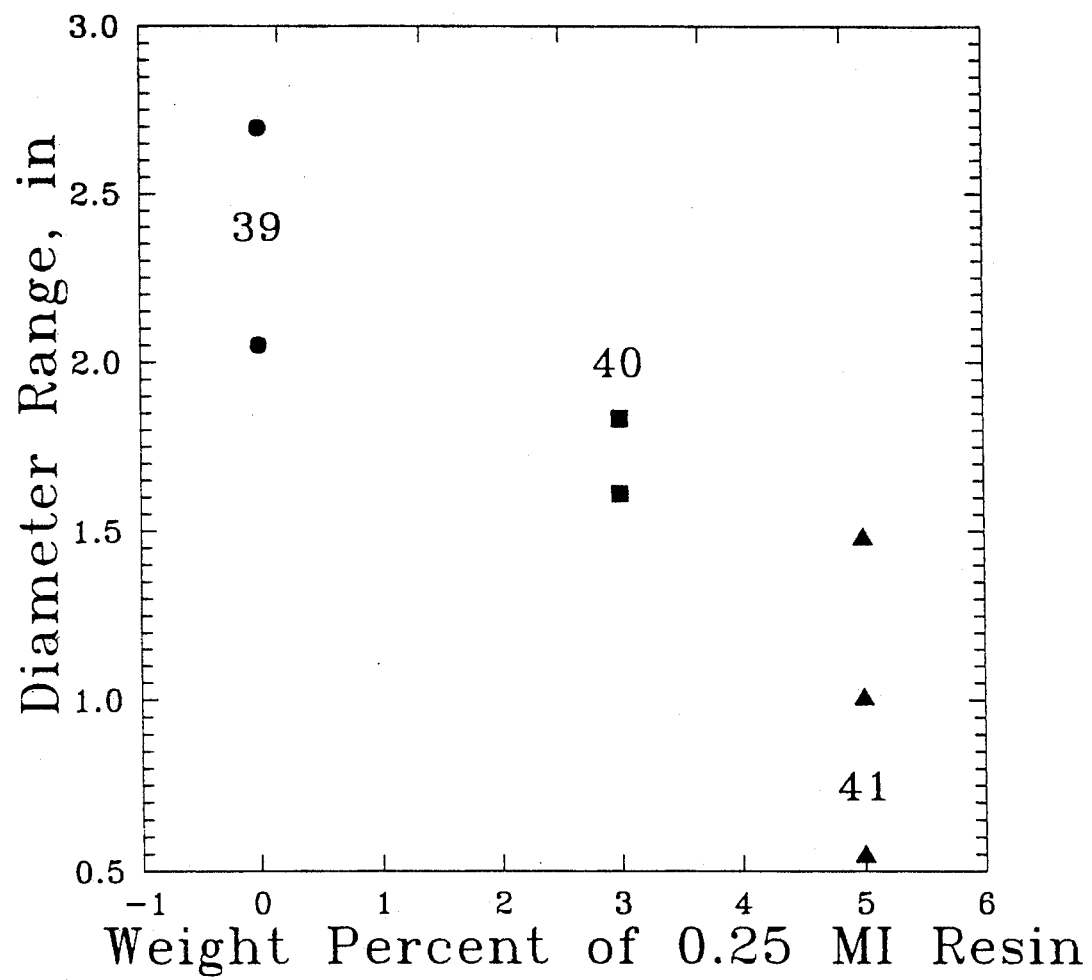
FIG. 8 is a plot of the change in the diameter of the bubble annulus as a function to 0.25 MI high pressure resin concentration.

FIG. 6 shows edge position data taken on the industrial scale blown film line described above for the base resin, linear low density polyethylene resin (LLDPE) with a melt index (MI) of one. From the data, it is apparent that there is substantial and cyclical variation in the positions of the film edges. The mean left edge position 34 was found to be 12 inches with a standard deviation of 0.9 inches. The mean right edge position 34 was found to be 25.4 inches with a standard deviation of 0.7 inches. The mean diameter is calculated to be 13.1 inches. The diameter range for the data was found to be 9.6 inches. The cooling air flow was then adjusted until the diameter range was minimized. The minimum achievable diameter range was found to be between two and three inches for the base resin as shown by the dots in column 36 in FIG. 7 and column 39 in FIG. 8. The individual data points in each column of FIGS. 7 and 8 represent separate "runs" of the film line for each resin concentration. Data for at least two runs per column were taken and the diameter range calculated.

EXAMPLE TWO

Next using the same equipment and method used in Example One we reduced the process instability by using a second resin as an additive to aid in the stabilization of the blown film annulus. Two LDPE resins were available for use as additives, the first had a melt index (MI) of 2 and the second had a melt index (MI) of 0.25. The 2 MI resin is the more desirable stabilizing additive because it has a lower tendency to form gels in the film. The blown film line was running with the base LLDPE resin under the same operating conditions with a diameter range between two and three inches as shown at columns 36 in FIG. 7 and 39 in FIG. 8. Since the diameter range was greater than the desired level of one inch, a 2 MI resin was added to form a 3 (wt%) percent mixture, resulting in a decrease in diameter range to 1.7 to 2.4 inches as shown in column 37 in FIG. 7. The decrease in diameter range with the increase in 2 MI resin was used as a control input to increase the amount of 2 MI resin to 5 percent. As indicated by the data presented in FIG. 7 in column 38, there was no improvement in the stability.

EXAMPLE THREE

The control strategy used the above response to make the decision to switch to a 3 percent (wt%) mixture of a 0.25 MI resin. This action resulted in a reduction of the diameter range to 1.6 to 1.8 as shown at column 40 in FIG. 8. As a result of this reduction in diameter range, the concentration of 0.25 MI resin was increased to 5 (wt%) percent mixture. FIG. 8 at column 41 shows that this increased concentration of 0.25 MI resin meets the control objective of a diameter range of one inch or less.

The above examples show that the invention can be used to characterize instability in the blown film process. They also show that the invention can be used in a control strategy to maintain the stability of the blown film process at or below a control limit by manipulating either a process variable such as cooling air flow, the concentration of a stabilizing additive, or variation of other process parameters. The above format for the presentation of the stability characteristics of a process is convenient since it compresses the data into a single statistic, the diameter range, which describes the degree of instability in the process and can be readily understood by a machine operator. This format gives an estimate of the magnitude of the instability only and tells the user nothing concerning the type of instability or its cyclical nature. By analyzing the data using a Fast Fourier Transform, we can provide such information.

EXAMPLE FOUR

Example four describe the same equipment as used in Example One can be used with a different analysis method. FIGS. 9a, 9b, and 10a, 10b are plots of the magnitude terms of the Fourier Coefficients found by taking the Fourier transform of the left and right side bubble positions, respectively, versus time. The magnitude terms correspond to the amplitudes of sinusoidal disturbances. From the plots, it can be seen that the dominant disturbance frequencies are less than 2 Hz with amplitudes on the order of one inch. The dominant variations can be studied and related to various system parameters. For instance, the RPM of the resin feed screw may, through pressure, temperature or flow rate pulsations, be imparting disturbances to the annulus at a characteristic frequency. By knowing the frequency one may change the machine to eliminate the problem with the particular resin being run or the resin mixture may be changed to overcome the problem.

Figure 11:
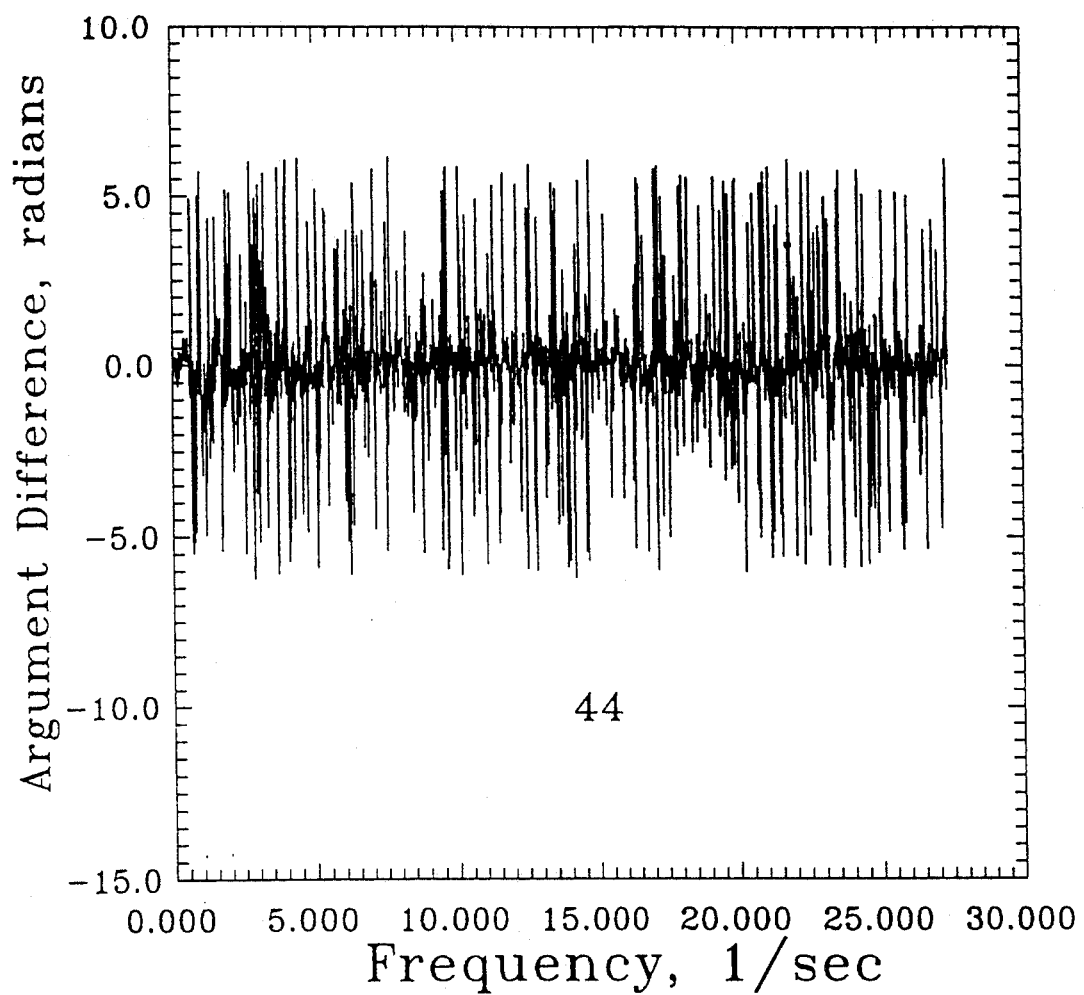
FIG. 11 is a plot of the Fourier argument difference as a function of frequency.

FIG. 11 is a plot of the difference between the argument terms of the Fourier Coefficients. At a frequency of 1 Hz, the argument difference was about 6 radians. (The actual digital data for this point was 1.5 $\pi$ radians). This indicates that the instability is neither pure bubble instability nor a pure helical instability, but rather a combination of the two. This format for data representation will also allow the user to do things such as relate the disturbances in bubble radius to disturbances in other process variables such as extrusion temperature and pressure. This would provide the user with information concerning which process variables must be stringently controlled to maintain stability. It is important to note that both methods give similar magnitudes of instability in the process.

From the above, it should be appreciated that the present invention provides a method and apparatus for the determination of the near real time position and stability of the position of an object i.e., the annulus in a blown film process. In particular, it is seen that the present invention advantageously employs an analog filter, video camera and a computer system to stabilize the location of the film annulus in near real time and provides the means and method to determine the diameter range and the Fourier coefficients which are both related to the process stability. These stability criteria are then used as control inputs to bring the process to a desired level of stability at a certain set of operating conditions.

While this invention has been explained with reference to the structure disclosed herein, it is not confined to the details set forth and this application is intended to cover any modifications and changes as may come within the scope of the following claims:

What is claimed is:

1. Apparatus for identifying the location of an object by detecting edge positions thereof comprising:
    imaging means scanning across said object for viewing the object and repeatedly outputting in real time at least one line of a video signal for further processing;
    hybrid analog filter means for processing the at least one line of video signal including high speed comparator means for testing the video signal versus a predetermined signal value to identify signal transitions in a selected one of the at least one line of video signal that corresponds to the edge positions of said object whereby said testing occurs in real time;
    circuit means for producing real time digital values in response to said signal transitions corresponding to the edge locations of the object along said selected line of video signal;
    storage means for holding said digital values from said circuit means for occurrence of said selected line of video signal; and
    processing means for computing the spatial relationship of at least one of said edge positions in relation to a known reference location based on the digital values in said storage means, and for computing variation of said spatial relationship of said at least one edge position over time to indicate rate of change of said edge position.

2. Apparatus for measuring uniformity of width of an elongated object as it is being formed out of a polymeric starting material and controlling the information of such object, which comprises:
    imaging means scanning across said object as the latter traverses a field of view thereof for viewing the polymeric material as it is being formed into a desired object shape and repeatedly outputting at least one line of a video signal;
    hybrid analog filtering means connected to an output of said imaging means for processing the video signal, the filtering means including signal level sensing circuitry for determining substantial changes in the magnitude of said video signal which represent transitions of the at least one line of video signal across edge positions of the object, and circuit means for providing digital values that represent the respective spatial locations along said line of video signal of said substantial changes in said signal level; and
    processor means for computing in real time the spatial locations of the edges of the object of polymeric material in response to said digital values; and for further computing variation of said spatial location of said edges over time to indicate stability of formation of the object;
    whereby the edge locations of the object formed of polymeric material are tracked in real time and appropriate process adjustment can be made in near real time.

3. Apparatus according to claim 2 wherein said imaging means comprises a video camera having a field of view sufficient to encompass the polymeric materials being formed, and means for clocking out a frame of lines of image signals;
    and said signal level sensing circuits sense the intensity of the lines of video signals generated by said camera as it varies between background and polymeric material signals.

4. Apparatus according to claim 3 wherein said hybrid analog filtering means signal level sensing circuits detect first and second signal intensity changes corresponding to first and second edges of the object of polymeric materials being formed for each line of each frame of video signals from said camera.

5. Apparatus according to claim 4 wherein said processor means includes:
    microprocessor means for computing the spatial location of the object edges indicated by said sensed signal changes;
    storage means for storing the relative positions of said first and second detected object edges for a plurality of frames of the video signal; and
    computational means for determining from said stored relative edge positions the edge locations of the polymeric material object as a function of time.

6. Apparatus according to claim 5 wherein said object of polymeric materials is a blown film annulus and said microprocessor means includes computational means for determining the diameter range and Fourier coefficients for said annulus so as to permit near real time analysis and control of the stability of formation of said annulus.

7. The method of sensing and identifying in real time the location of an edge of an object, with limited capacity slower computers such as AT compatible personal computers, which comprises the steps of:
    viewing the object with a video camera scanning repeatedly across said object to create a repetitive video image signal including at least one scan line extending across said object;
    monitoring in real time the at least one scan line of the video signal for video signal intensity;
    comparing in real time said video signal intensity with a predetermined threshold value;
    recording a first pixel location and time for the occurrence of said video signal intensity exceeding said threshold value in said scan line;
    recording a second pixel location for the occurrence of said video signal intensity falling below said threshold value in said scan line; and
    processing said recorded first and second pixel locations and times of occurrence to identify in real time the edge locations of the object.

8. The method according to claim 7 including passing each scan line of successive video frames through a high speed comparator;
    setting first and second counters to zero at the beginning of each scan line;
    comparing the video signal at each pixel location of each scan line with a preselected threshold value;

incrementing each counter pixel by pixel until the video signal in said comparator exceeds the preselected threshold value;

stopping the first counter;

incrementing said second counter pixel by pixel until the video signal in said comparator drops below said threshold value;

stopping said second counter; and recording the count accumulated on each of the stopped first and second counters indicating the location of the corresponding pixel.

9. The method according to claim 7 further including subjecting said location and time domain information to fast Fourier transformation;

recording the frequency and argument values of said Fourier transform to indicate parameters causing instability in the location of said edge; and adjusting at least one process parameter to control location and stability of said edge.

10. The method according to claim 9 further including plotting the Fourier Transform values of edge position magnitude versus frequency to indicate frequency at which undesired variations are occurring.

11. The method according to claim 7 wherein said monitoring step is done line by line for each video frame; and said first and second pixel locations only are stored for each line of each said video frame, so that data storage required for plotting edge location versus time is substantially reduced.

12. The method according to claim 7 including calculating the difference range between first and second pixel locations over time; and adjusting at least one process parameter to cause said difference range to achieve a desired predetermined value.

13. The method of controlling in near real time the stability of a polymeric extrusion process for extruding a base resin such as LLDPE for a blown film annulus extrusion application which comprises:

viewing the extruded polymeric material with a video camera to create a video image signal thereof, including at least one scan line traversing said extruded polymeric material;

monitoring in real time the intensity of said video image signal in said at least one scan line of said video image;

comparing in real time the video signal intensity in said at least one scan line with a predetermined value to determine changes indicating an edge of the extruded polymeric material;

recording the time and distance position along said scan line of said video signal intensity changes to represent spatial locations of the edges of said material;

calculating the edge locations of the extruded polymeric material indicated by said recorded time and distance positions to yield said edge locations as a function of time;

calculating variance in the edge locations as a function of time;

calculating the range of variance in the extruded polymeric material dimensions from said variations in edge locations; and varying at least one extrusion parameter in near real time to minimize said range of variation of dimensions to yield the desired stability of extrusion.

14. The method according to claim 13 including deriving a voltage from said video image signal;

comparing said voltage derived from the video signal with a predetermined voltage value for each scan line of each video frame;

recording the leading edge and trailing edge position of a blown film polymeric extrusion for each scan line as indicated by first and second changes in said derived video signal voltage for each scan line;

calculating the distance range for said extrusion from said leading and trailing edge positions; and adding a quantity of resin having a different melt index from that of the base resin, to the base resin being extruded, to change the distance range to the desired value.

15. The method according to claim 14 wherein said distance range is calculated in accordance with the formula:

$$\text{Distance range} = [(X_r + n\sigma_r) - (X_1 + n\sigma_1)] - [(X_r - n\sigma_r) - (X_1 - n\sigma_1)]$$

n = Number of standard deviations selected
$X_r$ = Mean right side position
$X_1$ = Mean left side position
$\sigma_r$ = Standard Deviation of right side position
$\sigma_1$ = Standard Deviation of left side position.

16. The method according to claim 14 wherein the diameter range for an extruded blown film annulus is calculated in accordance with the formula:

$$\text{Diameter range} = [(X + 3\sigma_r) - (X_1 + 3\sigma_1)] - [(X_r - 3\sigma_r) - (X_1 - 3\sigma_1)]$$

$X_r$ = Mean right side position
$X_1$ = Mean left side position
$\sigma_r$ = Deviation of right side position
$\sigma_1$ = Deviation of left side position.

17. The method according to claim 15 wherein said quantity of resin having a different melt index than the base index is varied to produce a distance range of a preselected percentage of the observed object dimension.

18. The method according to claim 15 wherein said quantity of resin having a different melt index than the base resin melt index is varied to produce a distance range of less than two inches.

19. The method according to claim 15 wherein said quantity of resin having a different melt index than the base resin index is varied to produce a distance range of 0.5 to 1.0 inches.

20. The method according to claim 15 wherein the base resin being extruded is LLDPE with a melt index of 1 and said resin being added is LDPE resin having a melt index of 2 and constitutes 3%(wt) of the resin mixture.

21. The method according to claim 15 wherein the base resin is LLDPE with a melt index of 1, and said resin being added is LDPE having a melt index of 0.25 and constitutes 5%(wt) of the resin mixture.

22. The method according to claim 13 wherein said monitoring of at least one scan line comprises monitoring a single scan line of the video image frame and selecting the scan line to be monitored from those located above the freeze line of the blown film extrusion to be controlled.

* * * * *